(12) United States Patent
Connor (10) Patent No.: US 9,290,213 B2
(45) Date of Patent: Mar. 22, 2016

(54) MULTI-LEVEL TRAILER

(71) Applicant: Stephran Pty. Ltd., Carrara (AU)

(72) Inventor: Raymond T. Connor, Upper Coomera (AU)

(73) Assignee: Stephran Pty., LTD., Queensland (AU)

( * ) Notice: Subject to any disclaimer, the term of this patent is extended or adjusted under 35 U.S.C. 154(b) by 0 days.

(21) Appl. No.: 14/685,050

(22) Filed: Apr. 13, 2015

(65) Prior Publication Data

US 2015/0291229 A1  Oct. 15, 2015

Related U.S. Application Data

(60) Provisional application No. 61/978,515, filed on Apr. 11, 2014.

(51) Int. Cl.
 *B62D 31/04* (2006.01)
 *B60P 3/32* (2006.01)
 *B62D 21/20* (2006.01)
 *B60P 3/36* (2006.01)

(52) U.S. Cl.
 CPC . *B62D 31/04* (2013.01); *B60P 3/32* (2013.01); *B60P 3/36* (2013.01); *B62D 21/20* (2013.01)

(58) Field of Classification Search
 CPC ...... B62D 31/025; B62D 31/04; B62D 21/20; B62D 53/08; B60P 3/32
 USPC ......... 296/156, 168, 184.1, 204, 209, 193.07, 296/203.01, 203.03
 See application file for complete search history.

(56) References Cited

U.S. PATENT DOCUMENTS

| | | | | |
|---|---|---|---|---|
| 1,554,102 | A * | 9/1925 | Kysor | B62D 53/061 280/81.1 |
| 4,239,276 | A * | 12/1980 | Bertolini | B62D 33/08 105/422 |
| RE37,351 | E * | 9/2001 | Crean | B60R 15/00 296/168 |
| 6,302,475 | B1 | 10/2001 | Anderson | |
| 6,343,830 | B1 * | 2/2002 | Ingram | B62D 53/061 280/433 |
| 6,729,678 | B1 * | 5/2004 | Atcravi | B60P 3/34 296/165 |
| 7,278,650 | B2 * | 10/2007 | Brady | B60P 3/32 280/441.2 |

* cited by examiner

*Primary Examiner* — Dennis H Pedder
(74) *Attorney, Agent, or Firm* — Botkin & Hall, LLP (57) ABSTRACT

A trailer is provided with a fixed height and length. The trailer has a frame with a hitch located at a front area and wheels mounted to axles at a rear area. The frame has a middle section that has an unobstructed opening where a middle floor rests below a top surface and is surrounded by the middle section. The middle floor is located below an upper floor to form a two-story trailer. A rear floor is located at an elevation between the middle floor and the upper floor.

18 Claims, 10 Drawing Sheets

MULTI-LEVEL TRAILER

CROSS REFERENCE TO RELATED APPLICATIONS

This application claims the benefit of U.S. Provisional Application No. 61/978,515, filed Apr. 11, 2014, the disclosures of which are hereby incorporated by reference.

BACKGROUND OF THE INVENTION

This present disclosure relates to mobile living quarters, specifically tow-behind trailers or recreational vehicles with multi-level construction. Currently many different types of trailers, recreational vehicles, and towable living spaces exist that attempt to maximize storage space. Many manufacturers utilize slide-out sections to increase living space, but these are limited to increasing horizontal space. Other manufacturers attempt to increase space by having a pop-up section. However, pop-up sections make the living space unusable during transportation, as the pop-up must be in a stowed position. Sealing, mechanism, and other failures complicate the use of a pop-up section. Therefore, an improved multi-level living space is needed.

SUMMARY OF THE INVENTION

The present disclosure describes a fifth-wheel trailer that is constructed with a lower, intermediate, and upper level. The lowest level is in the centermost portion, located forward of the axles and rearward of the hitch. By having multiple levels, the living space can be split into several compartments, allowing privacy while not requiring a pop-up section. Usable living space is created by maximizing the height of a room. The height of the room is limited by the location of the floor and the height of the ceiling. By attaching the lowest floor to the bottom section of the frame as low as possible, enough height is created to have a 2-story trailer with a fixed roof.

BRIEF DESCRIPTION OF THE DRAWINGS

A preferred embodiment of this invention has been chosen wherein.

DESCRIPTION OF THE PREFERRED EMBODIMENT

Figure 1:
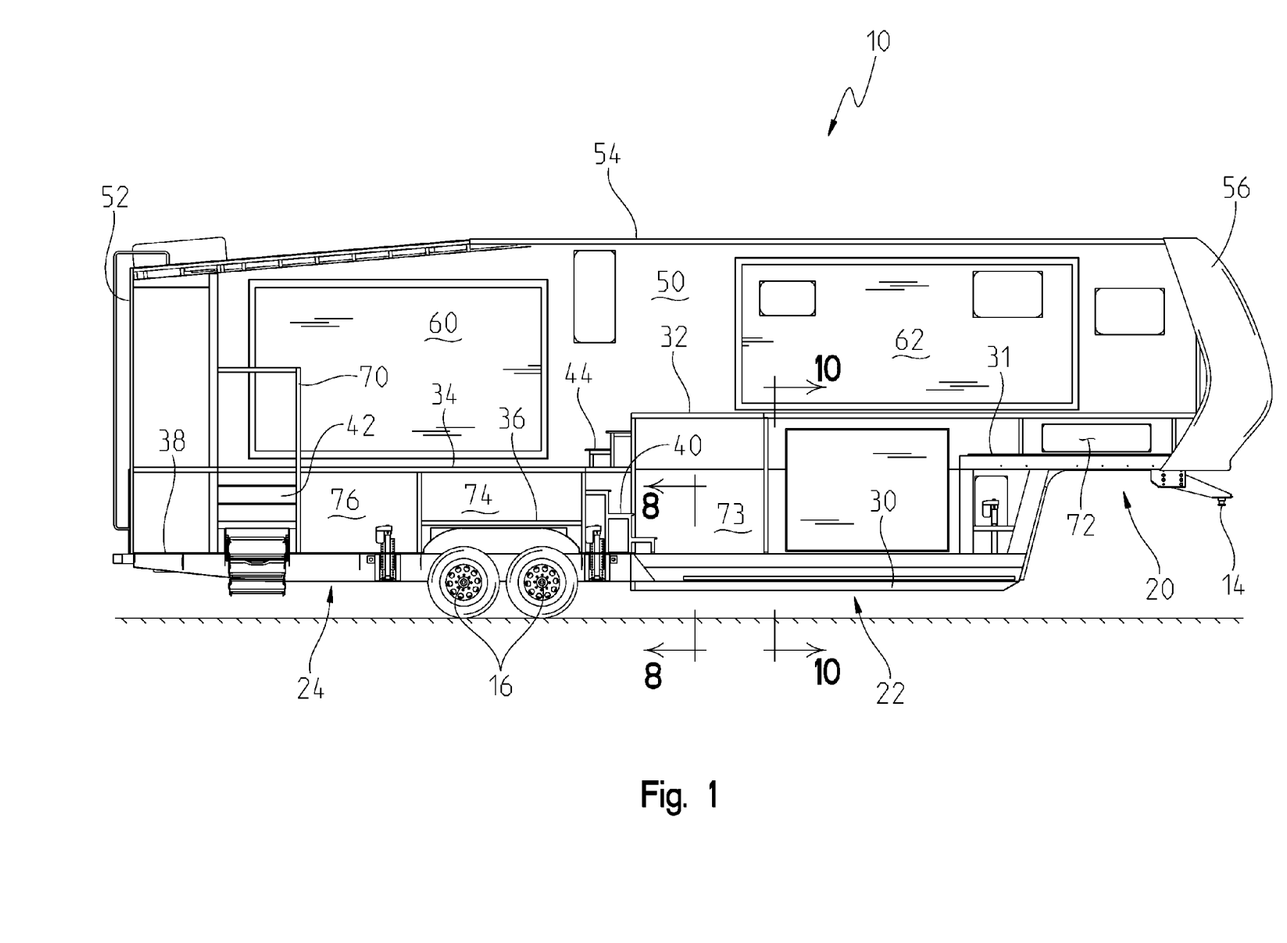
FIG. 1 is a side view of the trailer with a sidewall removed.
Figure 3:
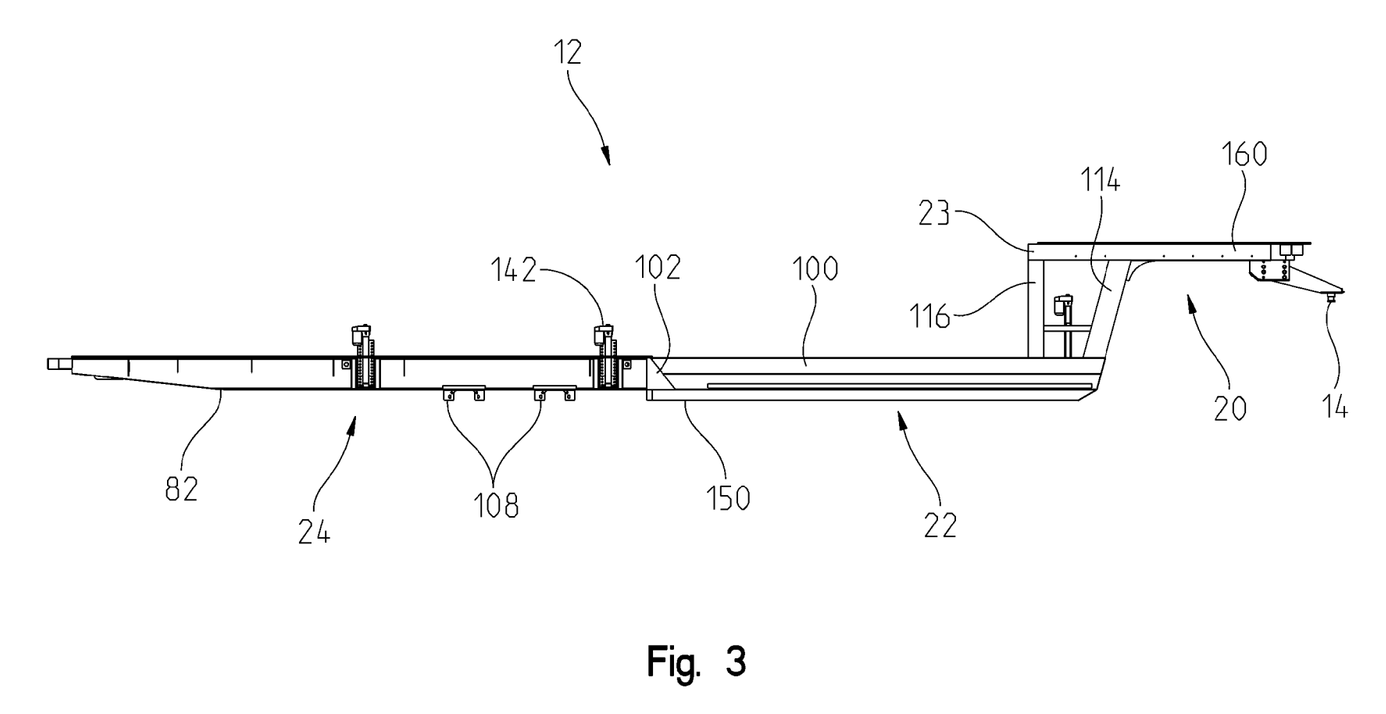
FIG. 3 is a side view of only the frame from the trailer in FIG. 1.
Figure 5:
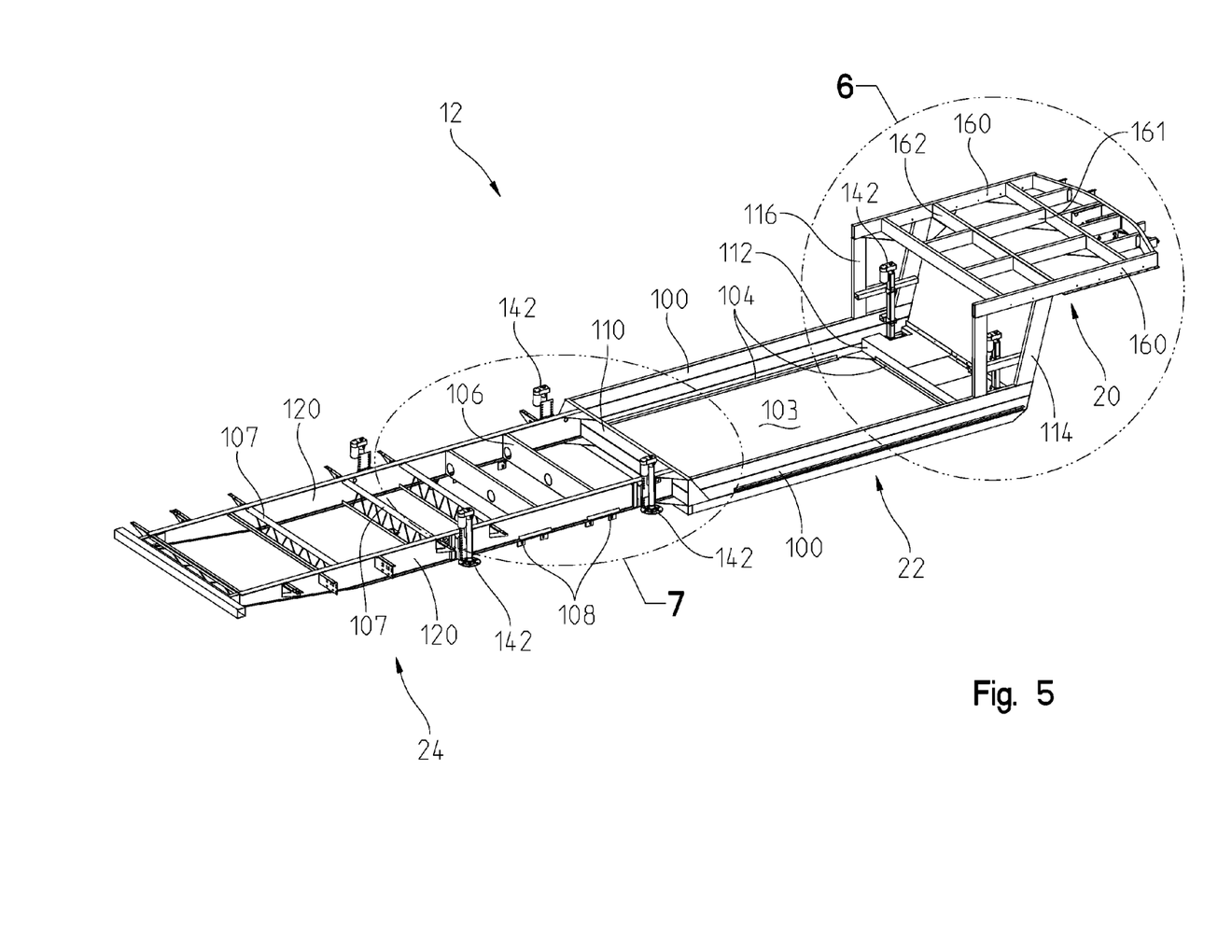
FIG. 5 is a top isometric view of the trailer frame only.
Figure 6:
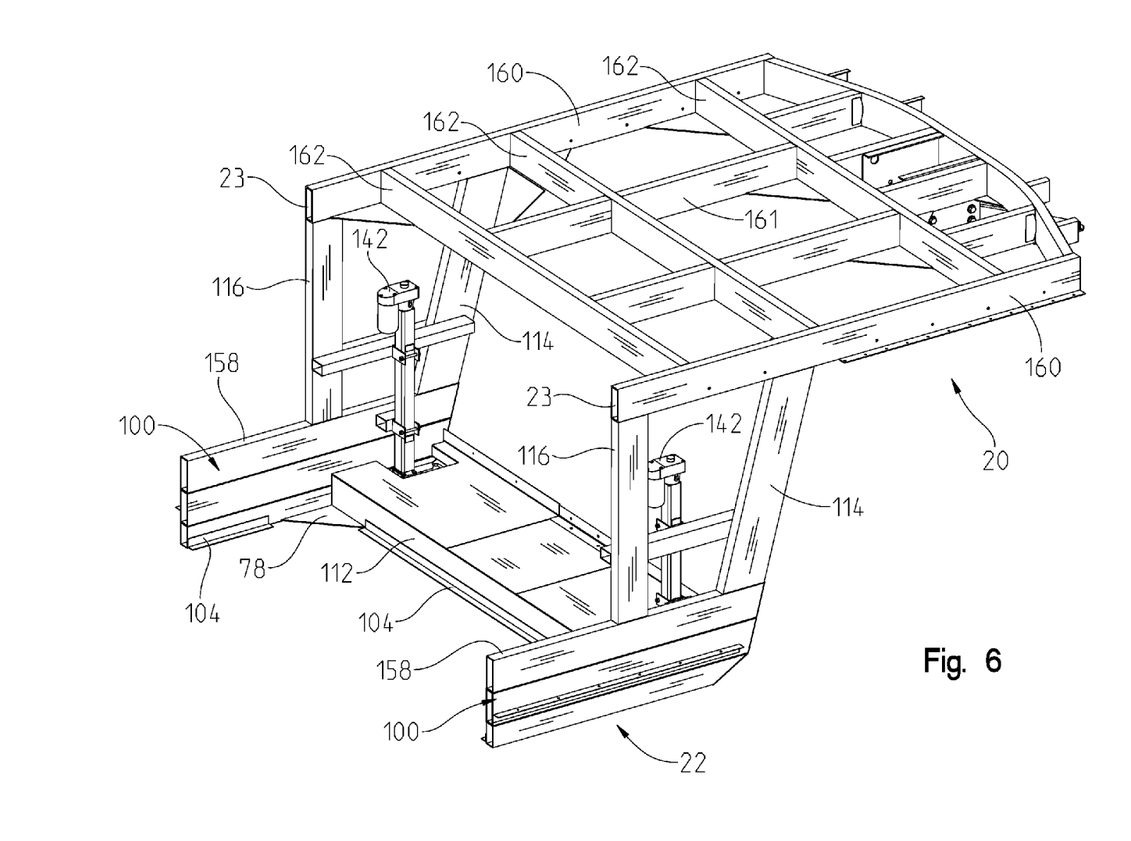
FIG. 6 is a partial view 6 in FIG. 5.
Figure 7:
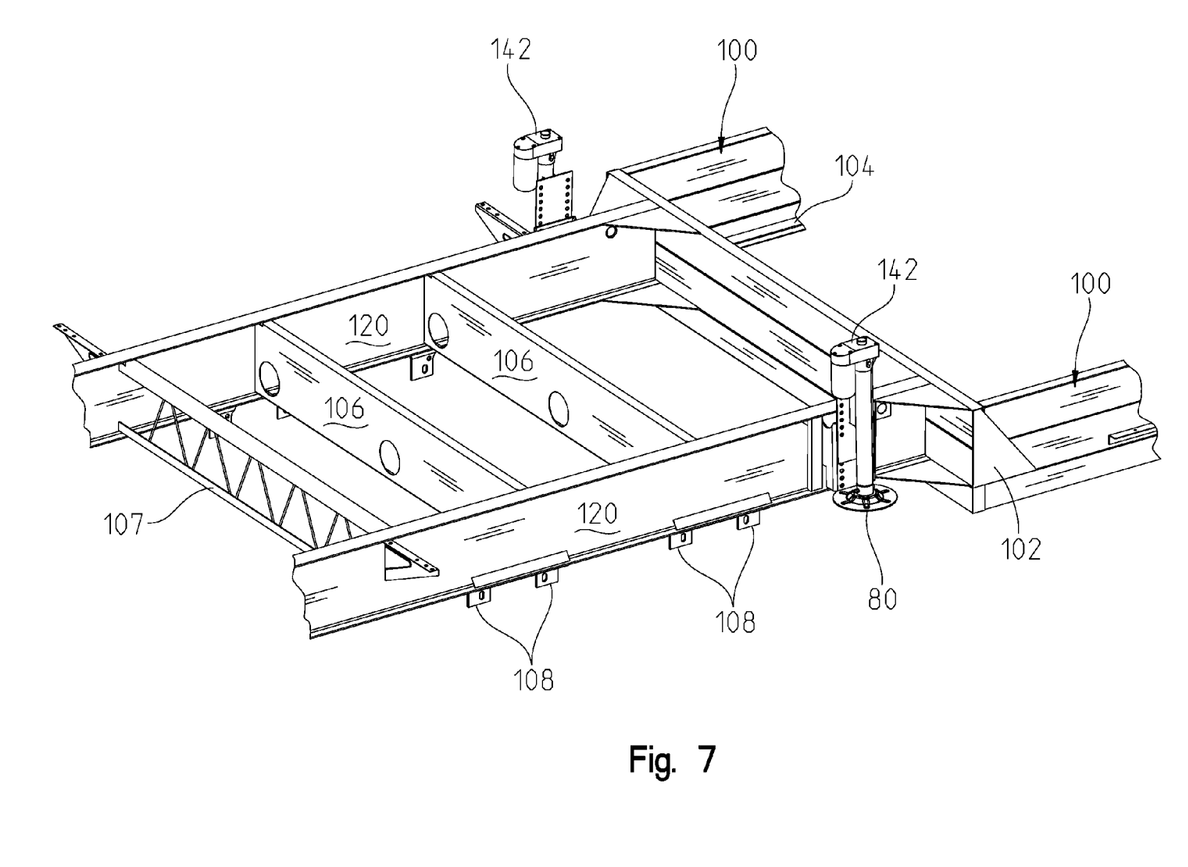
FIG. 7 is a partial view 7 in FIG. 5.
Figure 8:
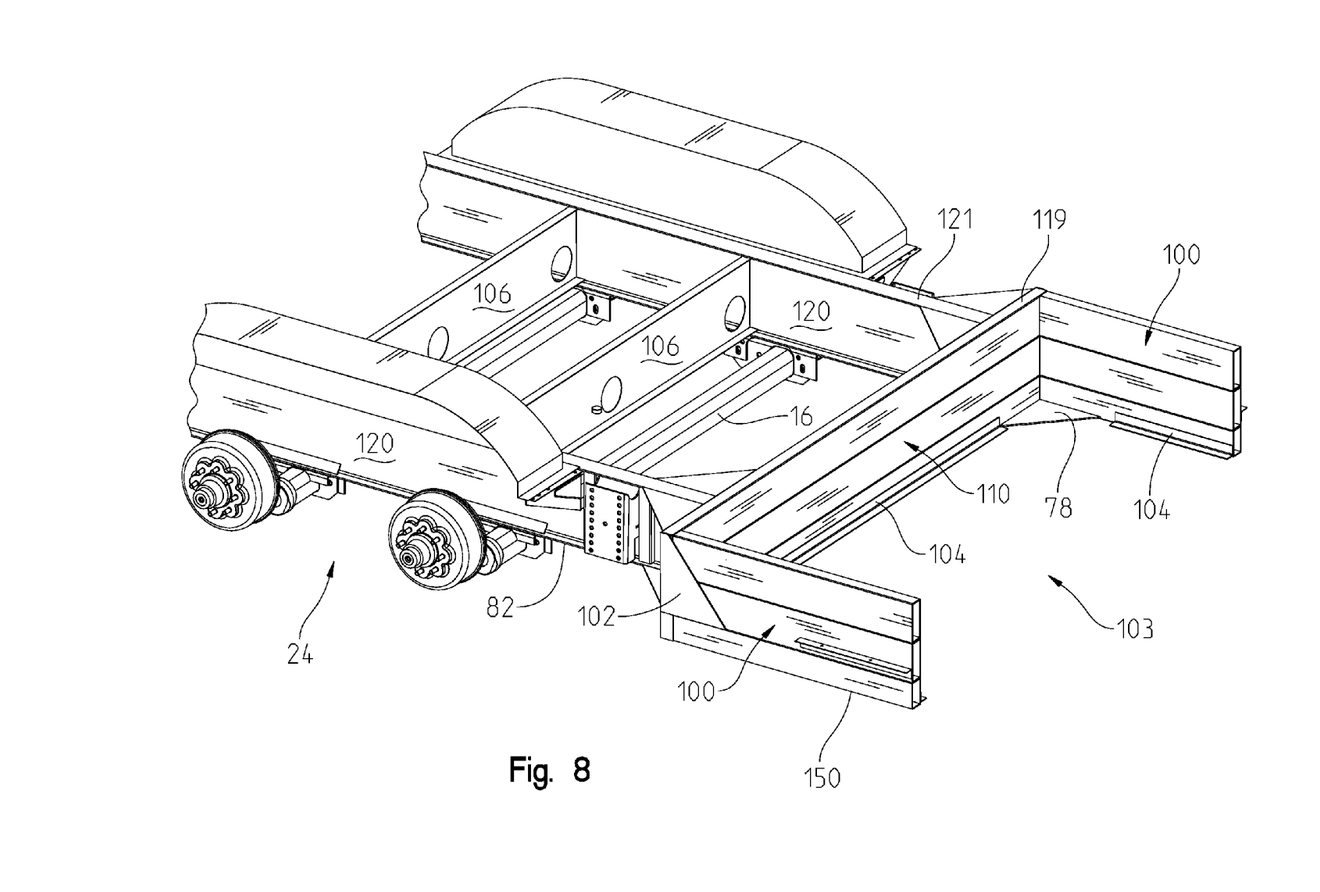
FIG. 8 is an isometric view of section 8-8 in FIG. 1 with only the trailer frame visible.
Figure 9:
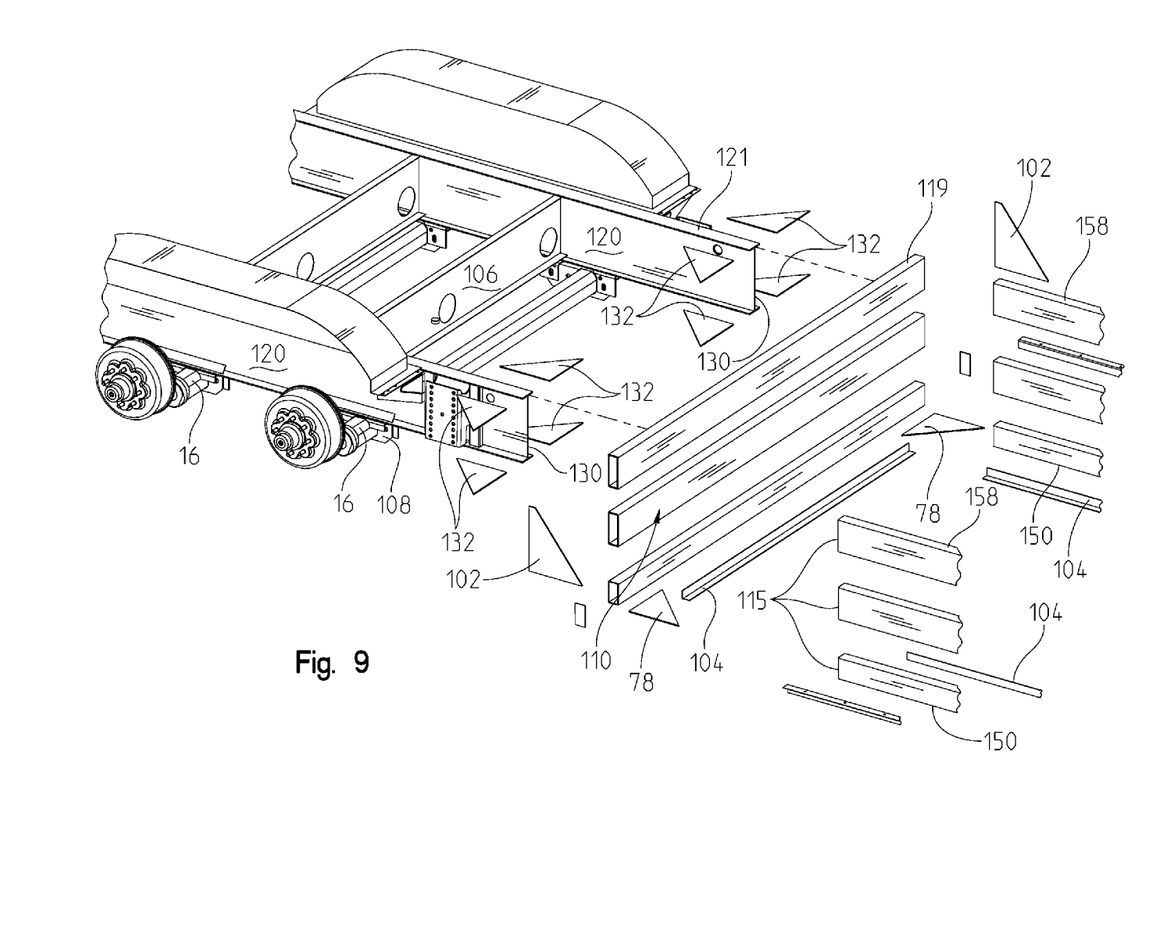
FIG. 9 is an exploded view of the trailer frame in FIG. 8.
Figure 10:
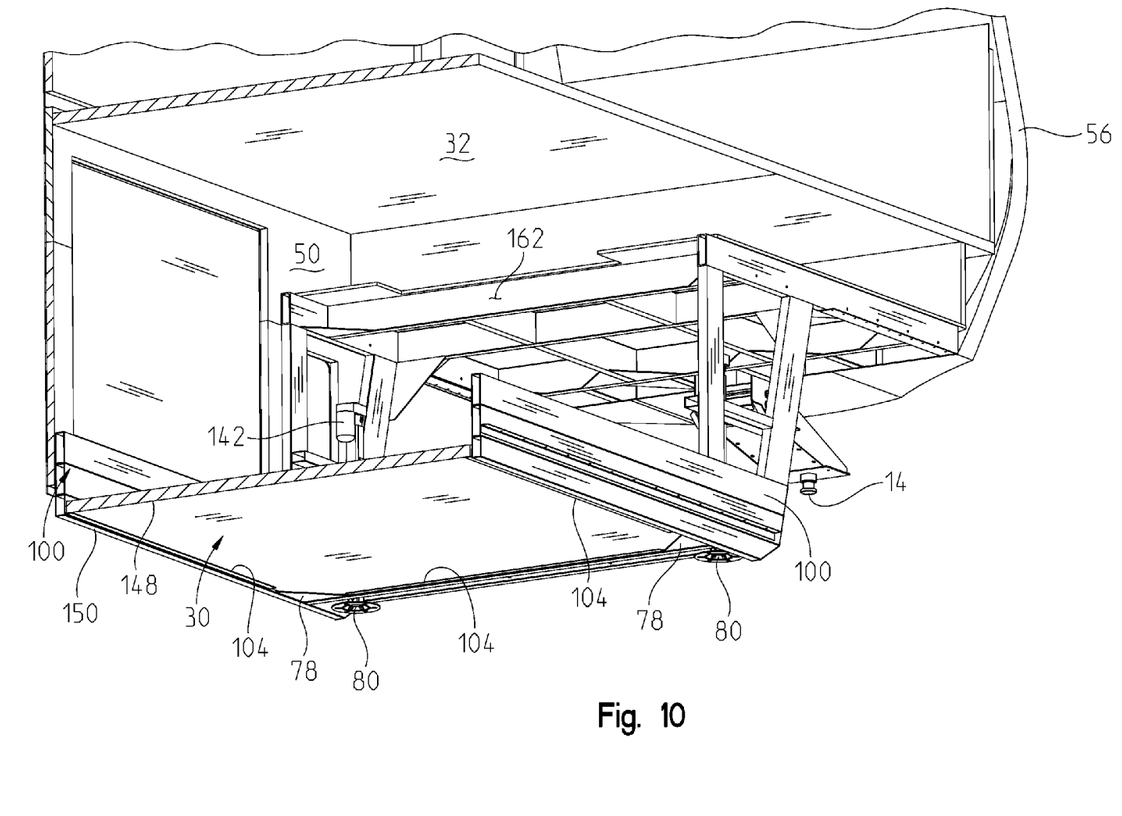
FIG. 10 is a bottom isometric view of section 10-10 of the trailer in FIG. 1.

A multi-level trailer 10 as shown in FIG. 1 is made from a frame 12 with a hitch 14 and axles 16. The axles 16 are attached to the frame 12 through axle attachment points 108 as is shown in FIG. 3 and commonly known in the art. The frame 12 is made up of several sections as is shown in FIGS. 3 and 5. The detail of the gooseneck section 20 as shown in FIG. 6 is located most forward of the trailer 10 where a hitch 14 is attached. The middle section 22 is located just rearward of the gooseneck section 20 and is the lowest point on the trailer. As is shown in FIGS. 5 and 6, support and bracing frame members 112, 114, 116 connect the gooseneck section 20 to the middle section 22. The rear section 24 is located just rearward of the middle section 22 and above the axles 16. The axles 16 as shown are swing-arm style, allowing the frame rails to be closer to the ground by putting the spindle near or above a bottom surface of the rear section 24. Likewise as shown in FIGS. 8 and 9, support and bracing frame members 102, 110, 132, connect the middle section 22 to the rear section 24. The frame 12 is one structural component, made from assembling several individual frame members.

Turning now to the detail of the frame structure, the gooseneck section 20 is made up of lateral frame rails 160 and cross members 162. The forwardmost cross member is curved to match the profile of the front 56. The hitch 14 is attached at a forward portion of the gooseneck section 20 on the cross members 162. Further reinforcements 161 extend between cross members 162 to provide further support. The gooseneck section 20 extends rearward and can partially overhang the middle section 22. The end of the gooseneck section is defined by rearward ends 23 of lateral frame rails 160. The middle section 22 has lateral frame rails 100 which are elongate structural components that span from the front to the rear of the middle section. As shown, the lateral frame rails 100 are several pieces but can be a single structural component. The lateral frame rails have support members 104 affixed adjacent to a bottom surface 150 of the rails 100. Abutting the front of the middle section 22 is a front cross member 112 that spans between the lateral frame rails 100 and defines the forwardmost edge of the middle section 22 as shown in FIGS. 5 and 6. A support member 104 is affixed to the bottom surface of the cross member 112. A vertical frame member 116 extends substantially perpendicular from a top surface 158 of the frame rails 100 and meets the gooseneck section 20 on a bottom surface of the lateral frame rails 160. An additional frame member 114 is set further forward and joins the frame members 100 to the gooseneck section 20 on the bottom surface of the lateral frame rails 160. At the rear of the middle section 22, a rear cross member 110 connects the frame rails 100. As shown, the rear cross member 110 is made up of several pieces but can be formed from a single structural member. The rear cross member 110 defines the rearmost edge of the middle section. Rear cross member 110 has a reinforcing member 104 affixed to the bottom surface. A perimeter is formed between the frame rails 100, front cross member 112, and rear cross member 110. A vertically unobstructed area 103 is created by the perimeter in the middle section 22 of the frame. There are no cross members spanning between the frame rails 100 in the middle section between front cross member 112 and the rear cross member 110. Extending into the unobstructed area 103 are corner gussets 78 that reinforce the intersection of frame rails 100 and their corresponding cross member 110, 112. These are visible in FIGS. 6, 8, 9, and 10.

As is shown in FIG. 5, the rear section 24 is made from two rear frame rails 120 and attached at the front to the center section 22 at terminal ends 130. Several reinforcing members are optionally included due to the unconventional structure of the center section 22. Horizontal gussets 132 reinforce the connection between the terminal ends 130 and the rear cross member 110. Further, vertical gussets 102 reinforce the ends of the frame rails 100 to the ends of the rear cross member 110. Rear frame rails 120 are located inwardly from and parallel to frame rails 100 where a top surface 121 is coplanar with top surface 119 of cross member 110 and the top surface 158 of the frame rails 100. The bottom surface 82 is located higher than the bottom surface 150 of the frame rails in the middle section. This allows increased clearance for wheels while allowing the frame rails to be closer to the ground. Axle attachment points 108 are attached to the bottom of the frame rails 120. Much like the gooseneck section 20, the rear section 24 has cross bracing 106 and 107. Frames can be formed from steel, aluminum, wood, or composite materials and can be C-shaped, I-shaped, U-shaped, tube or box shaped. The rear frame rails 120 are closer to each other than the lateral frame rails 100 and 160.

Figure 2:
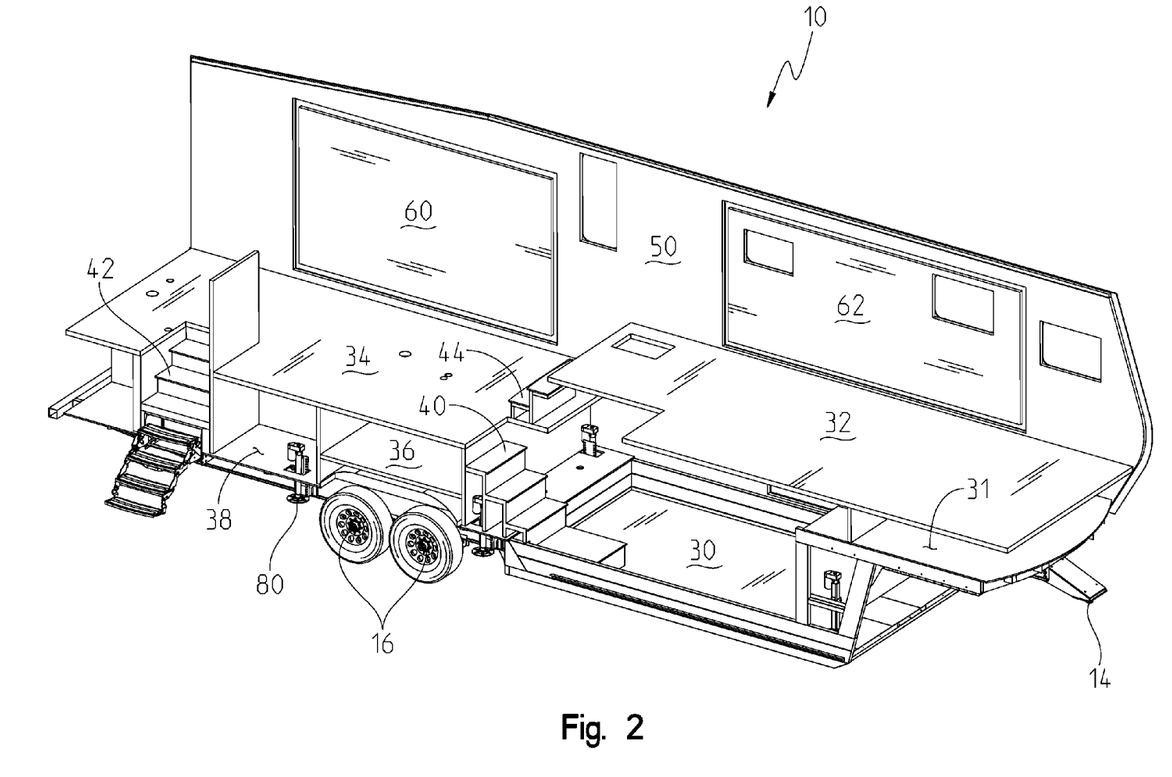
FIG. 2 is an isometric view of the trailer with the roof, a front, rear, and a sidewall removed.
Figure 4:
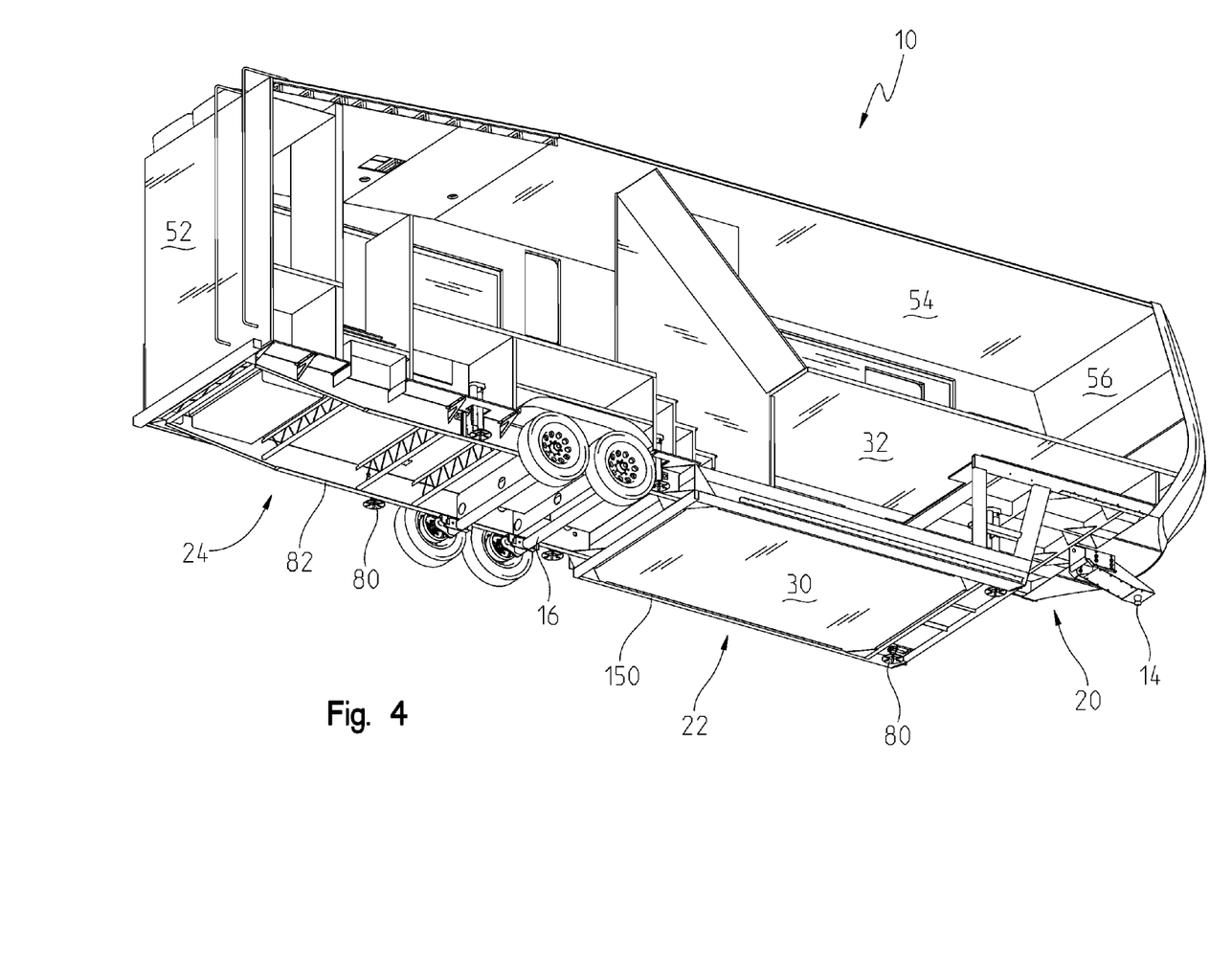
FIG. 4 is a bottom isometric view of the trailer with the sidewall removed.

Turning now to the trailer detail, the trailer 10 has several floor levels as shown in FIGS. 1, 2, and 4. Floors are normally attached on the top surface of frame rails and cross members, such as an axle floor 36, front floor 31, and a rear floor 38. The middle floor 30 is the lowest floor in the trailer 10 and is attached to the middle section 22. Because of the unobstructed area 103, it can be attached beneath the top surface and preferably nearly the bottom of the frame rails 100. A lower surface 148 of the middle floor 30 rests on an upper surface of the reinforcing members 104. The lower surface 148 is near the bottom surface of the frame rails 100 and cross members 110 and 112. The axle storage floor 36 is located just rearward and at a higher elevation than the middle floor 30. Located most rearward of the trailer 10 is the rear floor 38. The front floor 31 is attached to the gooseneck section 20.

Attached to the frame are sidewalls 50, a rear wall 52, and a front wall 56 as is shown in FIG. 1. Opposite the frame 12 and attached to the sidewalls 50, rear wall 52, and front wall 56, is the roof 54, which all combine to form an interior cavity, apportioned for living and storage space. Slide out sections 60, 62 can be installed in the sidewalls 50 such that living space can be increased as commonly known in the art. An entry door 70 is installed through one of the sidewalls 50 located rearward on the trailer and opens to stairs 42.

Attached to the sidewalls 50 are other floor levels such as the upper front floor 32 and upper rear floor 34. The upper front floor 32 is located forward and at a higher elevation than the upper rear floor 34. As is shown in FIG. 2, compartmentalized areas are formed between the floors 30, 32, 34, 36, 38 and roof. These areas are utilized as storage or living space. Between the middle floor 30 and the upper front floor 32, a usable amount of living space 73 is created due to the middle floor 30 being attached to the middle section 22 as low as possible. Because there are no cross members between frame rails 100, the middle floor 30 must be either self-supporting or supported from another part of the trailer such as interior walls. In the embodiment shown in FIG. 1, the upper front floor 32 is roughly centered between the roof 54 and the middle floor 30. The middle floor 30 has sufficient room for an average height person to stand. The distance between the roof 54 and the upper front floor 32 is also sufficient for a person of average height to stand. The roof 54 slopes downward towards the rear 52 and the upper rear floor 34 is located lower than the upper front floor 32. The upper front floor 32 is accessible from the upper rear floor 34 by stairs 44. The upper rear floor 34 is accessible from the middle floor 30 through another set of stairs 40. The upper rear floor 34 is accessible from a door 70 through the third set of stairs 42. A forward storage compartment 72 is created between the upper front floor 32 and the front floor 31. An axle storage compartment 74 is created between the upper rear floor 34 and the axle floor 36. A rear storage compartment 76 is created between the upper rear floor 34 and the rear floor 38.

Landing gear 142 is affixed to the frame on opposite sides of the center section 22 and rearward of the axles 16. The landing gear 142 has a foot 80 that can be deployed to support and stabilize the trailer 10 when it is not connected to a vehicle. In FIGS. 1-7, the landing gear is shown in the refracted position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A towable multi-level trailer comprising:
a front wall, sidewalls, a rear wall, and a fixed roof affixed to a trailer frame;
said trailer frame having a gooseneck section with a hitch extending therefrom, said gooseneck section having front lateral frame rails extending rearward and front transverse frame rails extending between opposing said front lateral frame rails and affixed thereto, a portion of said gooseneck section overlaying a front portion of a middle frame section;
said middle frame section having an unobstructed opening lacking cross members and formed from lateral frame rails a front transverse frame member spanning and fixed to said lateral frame rails and a rear transverse frame member spanning and fixed to said lateral frame rails opposite said front transverse frame member, said front transverse frame member, said lateral frame rails, and said rear transverse frame member forming a perimeter circumscribing said unobstructed opening, said middle frame section having a top surface and an oppositely located bottom surface, said middle frame section having a support member extending partially inwardly into said unobstructed opening and having a support surface located relatively near said bottom surface;
said trailer frame having a rear section with rear lateral frame rails affixed to said rear transverse frame member, said rear section having an upper surface substantially coplanar with said top surface of said middle frame section;
an axle affixed to said rear section to support said trailer;
a middle floor circumscribed by said perimeter and located below said top surface of said middle frame section, said floor overlaying said support surface of said support member;
a rear floor affixed to said upper surface of said rear section and an upper rear floor located intermediate to said rear floor and said roof; and
an upper floor overlaying said middle floor and spaced therefrom to create a lower living space between said upper and middle floor, said upper floor creating an upper living space between said roof and said upper floor, a portion of said upper living space overlaying said gooseneck section, said upper floor located at a higher level than said upper rear floor.

2. The trailer of claim 1, said support surface is located intermediate to said top surface of said middle frame section and said bottom surface of said middle frame section.

3. The trailer of claim 2, said upper floor overlying no portion of said upper rear floor.

4. The trailer of claim 3, said middle frame section having corner gussets affixed to inside corners of said unobstructed opening and extending inwardly.

5. The trailer of claim 4, said corner gussets have an upper surface aligned with said support surfaces of said middle frame section.

6. The trailer of claim 5, and lower stairs extending between said middle floor and said upper rear floor to allow access therebetween, said trailer having upper stairs extending between upper rear floor and said upper floor to allow access therebetween.

7. The trailer of claim 2, a lower surface of said rear section is located above said bottom surface of said middle frame section.

8. The trailer of claim 7, said axle having a wheel rotating about an axis, said axis located adjacent said rear section.

9. The trailer of claim 8, said rear lateral frame rails separated by a first distance, said lateral frame rails of said middle frame section separated by a second distance, said second distance greater than said first distance.

10. A towable multi-level trailer comprising:
a front wall, sidewalls, a rear wall, and a fixed roof affixed to a trailer frame;
said trailer frame having a gooseneck section with a hitch extending therefrom, said gooseneck section having front lateral frame rails extending rearward and front transverse frame rails extending between opposing said front lateral frame rails and affixed thereto, a portion of said gooseneck section overlaying a front portion of a middle frame section;
said middle frame section having an unobstructed opening lacking cross members and formed from lateral frame rails a front transverse frame member spanning and fixed to said lateral frame rails and a rear transverse frame member spanning and fixed to said lateral frame rails opposite said front transverse frame member, said front transverse frame member, said lateral frame rails, and said rear transverse frame member forming a perimeter circumscribing said unobstructed opening, said middle frame section having a top surface and an oppositely located bottom surface, said middle frame section having a support member extending partially inwardly into said unobstructed opening;
said trailer frame having a rear section with rear lateral frame rails affixed to said rear transverse frame member;
an axle affixed to said rear section to support said trailer;
a middle floor circumscribed by said perimeter and located below a top surface of said middle frame section, said floor overlaying said support member;
a rear floor affixed to said rear section and an upper rear floor located intermediate to said rear floor and said roof; and
an upper floor overlaying said middle floor and spaced therefrom to create a lower living space between said upper and middle floor, said upper floor creating an upper living space between said roof and said upper floor, a portion of said upper living space overlaying said gooseneck section, said upper floor located at a higher level than said upper rear floor.

11. The trailer of claim 10, said support member is located intermediate to said top surface of said middle frame section and said bottom surface of said middle frame section.

12. The trailer of claim 11, said upper floor overlying no portion of said upper rear floor.

13. The trailer of claim 12, said middle frame section having corner gussets affixed to inside corners of said unobstructed opening and extending inwardly.

14. The trailer of claim 13, said corner gussets have an upper surface aligned with said support member of said middle frame section.

15. The trailer of claim 14, and lower stairs extending between said middle floor and said upper rear floor to allow access therebetween, said trailer having upper stairs extending between upper rear floor and said upper floor to allow access therebetween.

16. The trailer of claim 11, a lower surface of said rear section is located above said bottom surface of said middle frame section.

17. The trailer of claim 16, said axle having a wheel rotating about an axis, said axis located adjacent said rear section.

18. The trailer of claim 17, said rear lateral frame rails separated by a first distance, said lateral frame rails of said middle frame section separated by a second distance, said second distance greater than said first distance.

* * * * *